US005729209A

United States Patent [19]

Motohashi

[11] Patent Number: 5,729,209

[45] Date of Patent: Mar. 17, 1998

[54] RADIO SELECTIVE CALL RECEIVER WITH HAVING ELECTRONIC POCKET NOTEBOOK FUNCTION FOR ORGANIZING MESSAGES

[75] Inventor: Teruyuki Motohashi, Tokyo, Japan

[73] Assignee: NEC Corporation, Tokyo, Japan

[21] Appl. No.: 501,910

[22] Filed: Jul. 13, 1995

Related U.S. Application Data

[63] Continuation of Ser. No. 139,523, Oct. 20, 1993, abandoned.

[30] Foreign Application Priority Data

Oct. 26, 1992 [JP] Japan .................................... 4-287205

[51] Int. Cl.$^6$ ........................................ H04Q 7/18

[52] U.S. Cl. ................................ 340/825.44; 340/825.69; 340/311.1; 455/186.2; 455/31.1; 455/426; 370/313

[58] Field of Search ........................ 340/825.44, 825.47, 340/825.52, 825.68, 825.69, 311.1; 455/186.1, 382.2, 186.2, 31.1, 426; 370/313

[56] References Cited

U.S. PATENT DOCUMENTS

| | | | |
|---|---|---|---|
| 4,783,654 | 11/1988 | Ichikawa | 340/825.44 |
| 4,839,628 | 6/1989 | Davis et al. | 340/825.44 X |
| 4,839,641 | 6/1989 | Mori et al. | 340/825.47 |
| 5,177,477 | 1/1993 | Fennell et al. | 340/825.44 |
| 5,359,317 | 10/1994 | Gomez et al. | 340/825.44 |
| 5,430,439 | 7/1995 | Bodet et al. | 340/825.44 |

FOREIGN PATENT DOCUMENTS

| | | |
|---|---|---|
| 0441385 A1 | 2/1991 | European Pat. Off. . |
| 0434231 A2 | 6/1991 | European Pat. Off. . |
| 2 253 501 A | 9/1992 | United Kingdom . |
| 2553501 | 9/1992 | United Kingdom . |
| WO92/15971 | 9/1992 | WIPO . |

*Primary Examiner*—Michael Horabik
*Assistant Examiner*—William H. Wilson, Jr.
*Attorney, Agent, or Firm*—Whitham, Curtis, Whitham & McGinn

[57] ABSTRACT

A radio selective call receiver with display includes, a storage device for storing at least received messages, a display device for displaying the received messages, an adder for associating the retrieval attribute to the received messages, and a retrieving mechanism for retrieving the received messages on the basis of the retrieval attribute. The retrieval attribute can be selectively added at any time of reading out a received message or when displaying the message at a time of reception. Further, an added retrieval attribute can be selectively changeable or deletable any time after reception of the message, and a received message, not requiring retrieval, may have no retrieval attribute set, thereby to exclude the received message from retrieval messages.

20 Claims, 3 Drawing Sheets

Retrieval Attribution Storage Section 101

Received Message Storage Section 102

| | |
|---|---|
| — | 4/9, conference from 13:00. |
| — | Urgent, contact home, from brother. |
| — | 4/1, Yamamoto Trading Co. gets together at 15:00. |
| — | On Sunday, I wait in Yokohama at 11:00. |
| — | 4/10, at 7 afternoon, as usual. |
| | |

FIG.2A 101 102

| | |
|---|---|
| COMPANY | 4/9, conference from 13:00. |
| OTHERS | Urgent, contact home, from brother. |
| COMPANY | 4/1, Yamamoto Trading Co. gets together at 15:00. |
| PRIVATE | On Sunday, I wait in Yokohama at 11:00. |
| PRIVATE | 4/10, at 7 afternoon, as usual. |
| | |

FIG.2B

RADIO SELECTIVE CALL RECEIVER WITH HAVING ELECTRONIC POCKET NOTEBOOK FUNCTION FOR ORGANIZING MESSAGES

This is a Continuation of application Ser. No. 08/139,523 filed Oct. 20, 1993, now abandoned.

BACKGROUND OF THE INVENTION

The present invention relates to a radio selective call receiver with display and, more particularly, to a radio selective call receiver with display, which has a function of an electronic notebook.

The conventional radio selective call receiver with display has a function of displaying a received message together with its own selective call number. Such a radio selective call receiver with display is sometimes provided with the function of an electronic notebook, the received messages and the information inputted as desired can be retrieved or searched and displayed by further comprising the keyboard or like input means and also a control unit, a memory and a display unit.

If the above radio selective call receiver having the display function is provided with an electronic notebook function, when a message is received together with its own selective call number, the message is stored in a memory. However, the received message is not provided with any retrieval information. In addition, the message is different in format depending on its transmitter. Therefore, it is impossible to obtain efficient retrieval of the necessary message by making use of the electronic notebook function.

SUMMARY OF THE INVENTION

An object of the present invention is therefore to provide a radio selective call receiver with display capable of efficient retrieval and display of only desired information based upon the electronic notebook function.

According to the present invention, there is provided a radio selective call receiver with display comprising, storing means for storing at least received messages, display means for displaying the received messages, input means for inputting retrieval attribution to be added to the received messages, adding means for adding the retrieval attribution to the received messages, and retrieving means for retrieving the received messages on the basis of the retrieval attribution.

According to another aspect of the present invention, there is provided a radio selective call receiver comprising, an antenna, a radio unit for amplifying and demodulating radio signals received by an antenna, a waveform shaper for shaping the demodulated signal in shape and converting the shaped signal into a digital signal, an ID memory storing its own selective call number, a decoder for comparing the own selective call number read out from the ID memory and a signal obtained through decoding of the digital signal from the waveform shaper, a keyboard switch for inputting retrieval attribution for the received message, a display for visibly displaying the message arrival, a loudspeaker for audible display of the message arrival, and a retriever for retrieving the message on the basis of the retrieval attribution.

BRIEF DESCRIPTION OF THE DRAWINGS

FIGS. 2(A) and 2(B) show examples of received messages in the embodiment, and

PREFERRED EMBODIMENT

Now, the invention will be described with reference to the drawings.

In FIG. 2, (A) shows received messages before addition of retrieval attribution, and (B) those after addition of retrieval attribution. In FIG. 3, (A) to (C) show first to third examples of retrieved message display, respectively.

Figure 1:
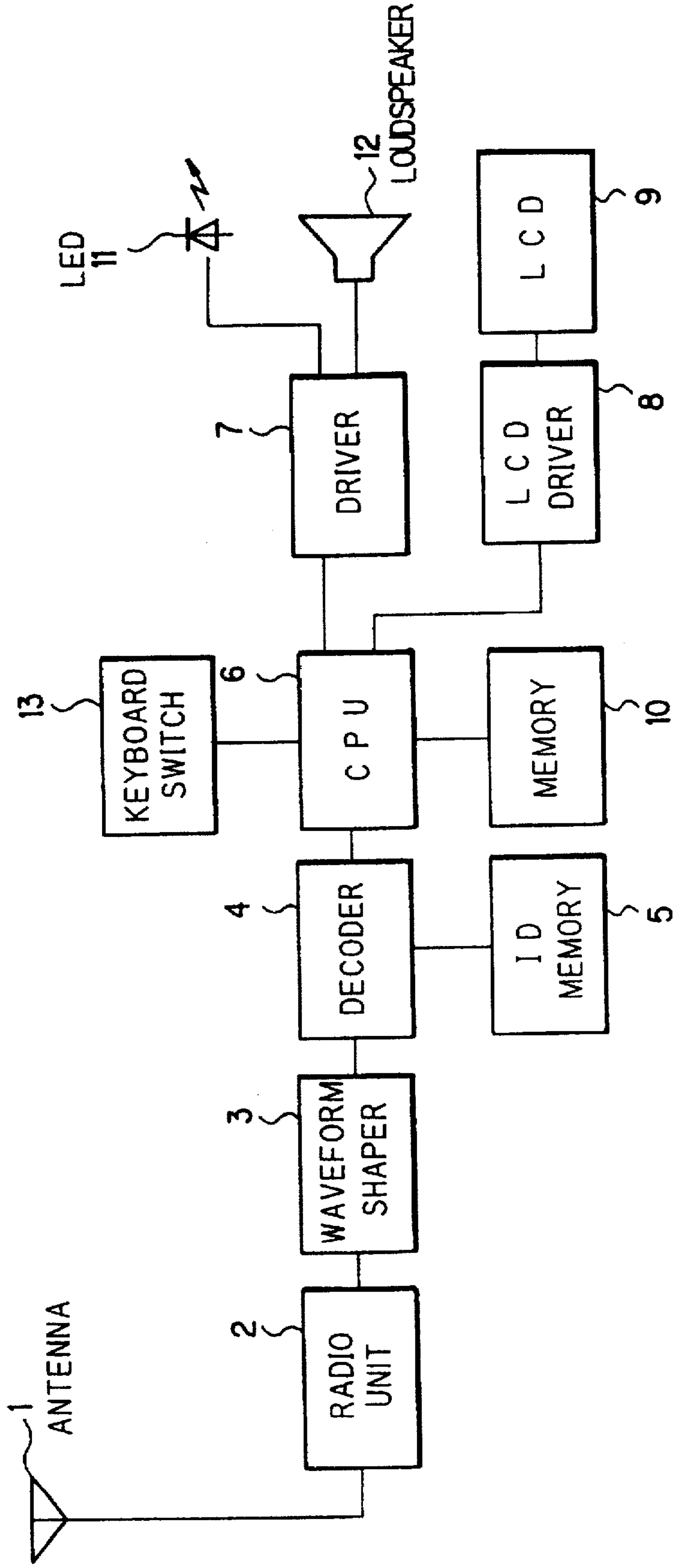
FIG. 1 is a block diagram showing an embodiment of the present invention.

Referring to FIG. 1, the radio selective call receiver in this embodiment comprises the following elements. A radio unit 2 amplifies and demodulates a radio signal received via an antenna 1. A waveform shaper 3 shapes the demodulated signal in shape and converts the shaped signal into a digital signal. An ID memory 5 stores its own (unique) selective call number. A decoder 4 compares the own selective call number read out from the ID memory 5 and the signal obtained through decoding the digital signal from the waveform shaper 3. A keyboard switch 13 inputs the retrieval attribution for the received message. A memory 10 stores the received message. An LCD 9 displays the received message. An LCD driver 8 drives the LCD 9. An LED 11 visibly displays the message arrival. A loudspeaker 12 audibly displays the message arrival. A driver 7 controls and drives the LED 11 and loudspeaker 12. A CPU 6 controls the whole elements included in the embodiment.

The operation of the embodiment will now be described with reference to FIGS. 1 to 3.

Referring to FIG. 1, in this embodiment a radio signal received by the antenna 1 is amplified and then demodulated in the radio unit 2. The demodulated signal is converted in the waveform shaper 3 into a digital signal to be fed to the decoder 4 for comparison with the own selective call number stored in the ID memory 5. As a result of the comparison, if the own selective call number is received, a signal notifying the reception is supplied to the CPU 6. When the signal is input from the decoder 4, the CPU 6 outputs a control signal for notification to the driver 7 and also outputs a control signal to the LCD driver 8 for displaying a message on the LCD 9. The received message is stored in the memory 10 and is displayed again through the control of the CPU 6. When the control signal from the CPU 6 is received, the driver 7 drives the LED 11 and loudspeaker 12 to notify a call.

For the utilization of the electronic notebook function, the inputted information from the keyboard switch 13 is stored in the memory 10. The stored information can be retrieved by operating the keyboard switch 13, and also the information from the LCD 9 can be displayed by controlling the LCD driver 8.

Further, when displaying the received message, a desired word or phrase may be added as a retrieval attribution to the received message. The added retrieval attribution is stored together with the received message in the memory 10. Thus, it is possible to effectively attain retrieval of the received messages according to the retrieval attribution. That is, it realizes an effective retrieval by using the retrieval attribution word or phrase as a keyword.

Now, the addition of the retrieval attribution and the retrieval for the received message in this embodiment will be described.

FIG. 2(A) shows examples of the received message in the memory 10 before addition of retrieval attribution. The received messages stored in the memory 10 are, for example, as follows:

4/9, conference from 13:00.

Urgent, contact home, from brother.

4/1, Yamamoto Trading Co. gets together at 15:00.

On Sunday, I wait in Yokohama at 11:00.

4/10, at 7 afternoon, as usual.

The memory 10 has a received message storage area, which comprises a retrieval attribution storage section 101 and a received message storage section 102. Received messages are successively stored in the received message storage section 102. FIG. 2(*b*) shows examples of the received message with the added retrieval attribution from CPU 6 by operating the keyboard switch 13. In the illustrated examples, three retrieval attribution keywords of (1) "COMPANY", (2) "PRIVATE" and (3) "OTHERS" are set.

The received messages are retrieved according to the retrieval attribution keywords after addition of the retrieval attribution as shown in FIG. 2(B).

Figure 3A:
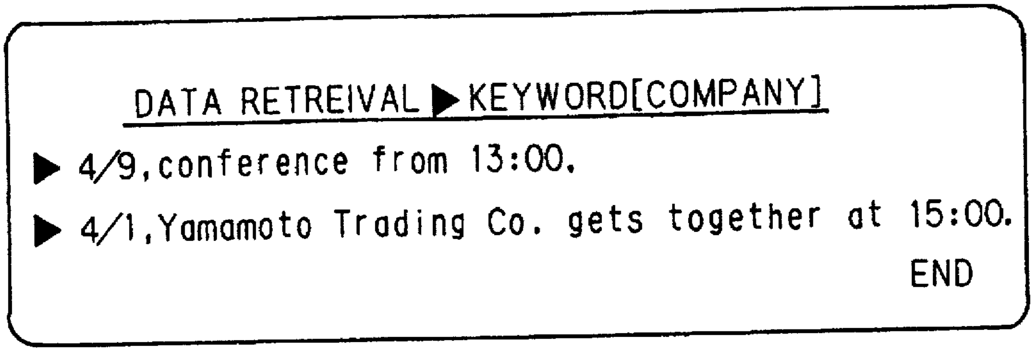
FIGS. 3(A)–3(C) show examples of retrieved message display in the embodiment.
Figure 3B:
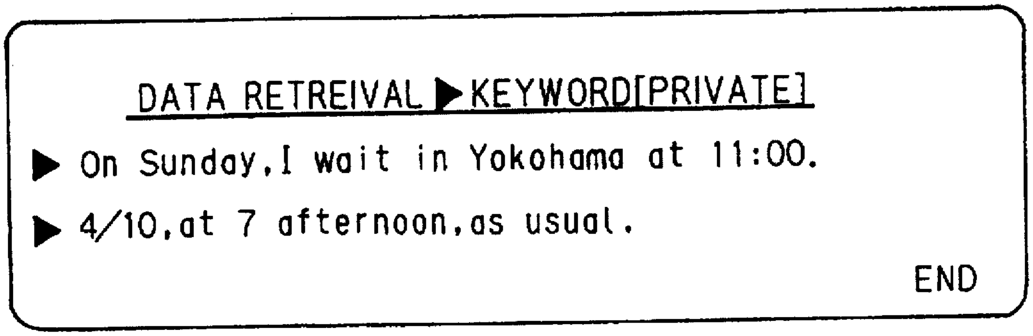
Figure 3C:
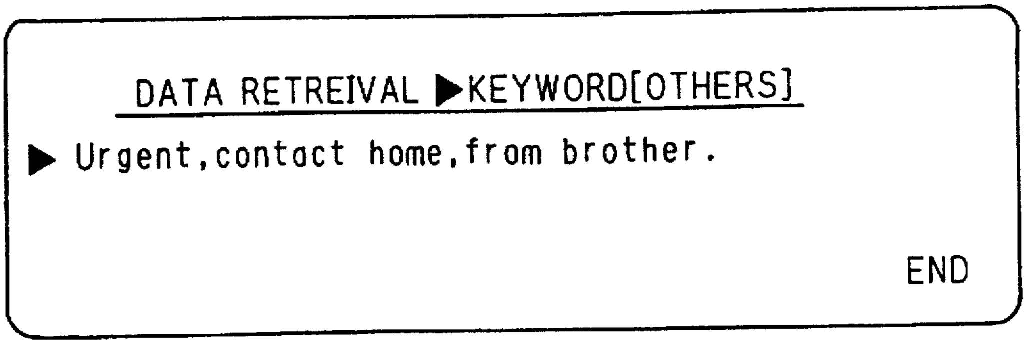

FIG. 3(A) shows the retrieval and display of the received message with the retrieval attribution specified as "COMPANY". Likewise, FIGS. 3(B) and 3(C) show the retrieval and display of received message with the retrieval attribution specified as "PRIVATE" and "OTHERS", respectively.

As has been described in the foregoing, in the radio selective call receiver with display according to the invention, the retrieval attribution is added to the received messages in advance to the retrieval and display of the received messages with the electronic notebook function. As a result, it is possible to obtain efficient retrieval and display of only desired information by making use of the electronic notebook function.

What is claimed is:

1. A radio selective call receiver with a display, comprising:

storing means for storing at least received messages and retrieval attributes, wherein said retrieval attributes are previously and arbitrarily set by an operator thereof when viewing the received messages, said received messages for retrieval not requiring therein said retrieval attributes wherein a retrieval attribute is selectively added at any time of reading out a received message or when displaying the message at a time of reception;

display means for displaying said received messages and said retrieval attributes;

associating means for associating said retrieval attributes with said received messages; and retrieving means for selectively retrieving said received messages on the basis of said retrieval attributes, wherein an added retrieval attribute is selectively changeable or deletable at any time after reception of said message, and wherein received message, not requiring retrieval, has no retrieval attribute set, thereby to exclude said received message from retrieval messages.

2. A receiver according to claim 1, wherein said storing means stores a retrieval attribute of said retrieval attributes together with a received message of said received messages.

3. A receiver according to claim 1, wherein said retrieval attributes are for use by said retrieving means, said retrieval attributes including a keyword.

4. A receiver according to claim 1, wherein said storing means includes first and second areas.

5. A receiver according to claim 4, wherein said first area of said storing means comprises a retrieval attribute storage section and said second area of said storing means comprises a received message storage section, said received messages being successively stored in said received message storage section.

6. A receiver according to claim 5, wherein said received messages are retrieved according to the retrieval attributes after said retrieval attributes have been associated with said received messages.

7. A receiver according to claim 1, wherein said retrieval attributes are associated with the received messages prior to retrieval of the received message.

8. A receiver according to claim 1, wherein said received messages and said retrieval attributes stored in said storing means are for use with an electronic notebook function, and wherein said retrieval attributes are previously and arbitrarily set by said operator thereof prior to retrieval and display of said received messages.

9. A receiver according to claim 8, wherein said retrieval attributes are user-definable prior to retrieval and display of said received messages, respective ones of said retrieval attributes indicating a characteristic of respective received messages to the operator prior to retrieval and display.

10. A radio selective call receiver with a display, comprising:

an antenna;

a radio unit for amplifying and demodulating a radio signal received via said antenna;

a waveform shaper for shaping the demodulated signal to form a shaped signal and converting the shaped signal into a digital signal, said digital signal including a received message;

an ID memory storing its own selective call number;

a decoder for comparing the own selective call number from said ID memory and a signal obtained by decoding the digital signal from said waveform shaper;

a keyboard switch for associating a predetermined retrieval attribute with the received message, wherein said retrieval attribute is previously and arbitrarily set by an operator thereof when viewing the received message, said received message for retrieval not requiring therein said retrieval attribute, wherein a retrieval attribute is selectively added at any time of reading out a received message or when displaying the message at a time of reception;

a display for visibly displaying the received message arrival;

a loudspeaker for audibly displaying the received message arrival; and a retriever for selectively retrieving said received message on the basis of said retrieval attribute, wherein an added retrieval attribute is selectively changeable or deletable any time after reception of said message, and wherein a received message, not requiring retrieval, has no retrieval attribute set, thereby to exclude said received message from retrieval messages.

11. A receiver according to claim 10, further comprising a storage for storing an associated retrieval attribute together with said received message.

12. A receiver according to claim 10, wherein said retrieval attribute is for use by said retriever, said retrieval attribute being a keyword.

13. A receiver according to claim 10, further comprising a storage for storing an associated retrieval attribute together with said received message, wherein said storage includes first and second areas.

14. A receiver according to claim 13, wherein said first area of said storage comprises a retrieval attribute storage section and said second area of said storage comprises a received message storage section, a plurality of received messages being successively stored in said received message storage section.

15. A receiver according to claim 14, wherein said received messages are retrieved according to the retrieval attribute after said retrieval attribute has been associated with said received messages.

16. A receiver according to claim 10, wherein said retrieval attribute is associated with the received message prior to retrieval and display of the received message.

17. A receiver according to claim 10, further comprising a storage for receiving an associated retrieval attribute together with said received message, wherein said received message and said retrieval attribute stored in said storage are for use with an electronic notebook function.

18. A receiver according to claim 17, wherein retrieval attributes are user-definable prior to retrieval and display of said received message, said retrieval attribute indicating a characteristic of the received message to the operator prior to retrieval and display of said received message.

19. A radio selective call receiver comprising:

storing means for storing received messages and retrieval attributes, wherein said retrieval attributes are previously and arbitrarily set by an operator thereof when viewing the received messages, said received messages for retrieval not requiring therein said retrieval attributes;

display means for displaying said received messages and said retrieval attributes;

associating means for associating said retrieval attributes with said received messages; and retrieving means for selectively retrieving said received messages on the basis of said retrieval attributes, wherein said storing means includes a retrieval attribute storage section and a received message storage section, said retrieval attributes being stored in said retrieval attribute storage section, and said received messages being successively stored in said received message storage section together selectively with an associated retrieval attribute of said retrieval attributes, wherein a retrieval attribute is selectively added at any time of reading out a received message or when displaying the message at a time of reception, wherein said received messages are stored solely in said received message storage section, said received message storage section comprising a single memory area, and wherein said received message storage section is devoid of a sorting operation, wherein an added retrieval attribute is selectively changeable or deletable any time after reception of said message, and wherein a received message, not requiring retrieval, has no retrieval attribute set, thereby to exclude said received message from retrieval messages.

20. A receiver according to claim 19, wherein said retrieval attributes are user-definable prior to retrieval and display of said received messages, and wherein said received messages and said retrieval attributes stored in said storing means are for use with an electronic notebook function, said retrieval attributes respectively indicating a characteristic of the received messages prior to retrieval and display of said received messages.

* * * * *